Nov. 13, 1956  E. K. DOMBECK  2,770,328
BRAKE ASSEMBLY
Filed June 27, 1950  3 Sheets-Sheet 1

INVENTOR.
EDWARD K. DOMBECK
BY
G A Gust
ATTORNEY

Nov. 13, 1956                E. K. DOMBECK                 2,770,328
                              BRAKE ASSEMBLY
Filed June 27, 1950                                      3 Sheets-Sheet 2

INVENTOR.
EDWARD K. DOMBECK
BY
ATTORNEY

Nov. 13, 1956    E. K. DOMBECK    2,770,328
BRAKE ASSEMBLY
Filed June 27, 1950    3 Sheets-Sheet 3

INVENTOR.
EDWARD K. DOMBECK
BY
G. A. Guest
ATTORNEY ured Nov. 13, 1956

2,770,328

BRAKE ASSEMBLY

Edward K. Dombeck, South Bend, Ind., assignor to Bendix Aviation Corporation, South Bend, Ind., a corporation of Delaware Application June 27, 1950, Serial No. 170,545

6 Claims. (Cl. 188—78)

The present invention relates to a brake mechanism of the internally expanding shoe type, for use on vehicles.

The primary object of the present invention is to provide a brake assembly which is simple in design, efficient in operation, and economical to produce and service.

Another object is to provide a brake of rugged design having an appreciably long service life. Another object is to provide a brake in which the shoe-anchoring member is supported at both of its ends to take the anchoring load of the brake shoes therebetween and to serve as a novel support for the brake actuating structure.

Other objects will become apparent as the description proceeds.

Figure 1:
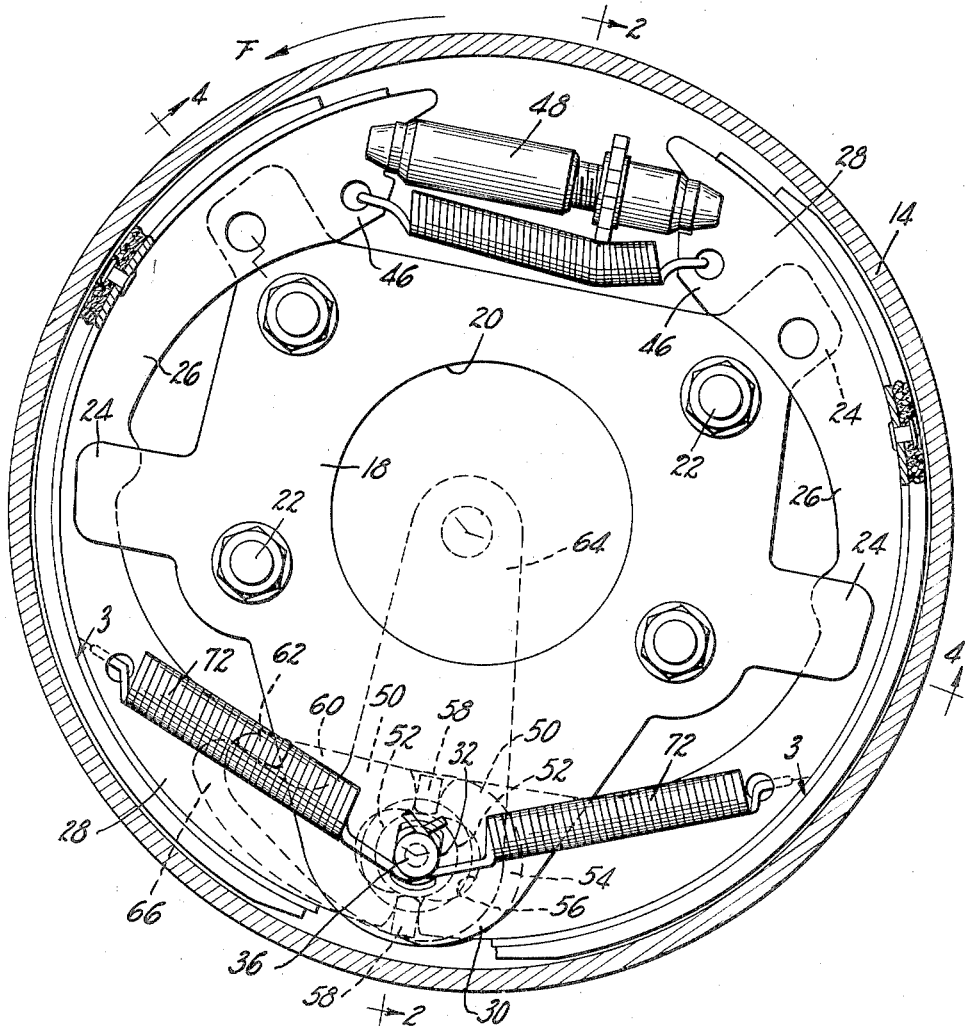
Figure 1 is a side elevation of an embodiment of the present invention.

Referring to the drawings, a cup-shaped housing 10 is adapted to be secured to a stationary part of the vehicle and receives therein for rotation a shaft 12 which is disclosed as being connectible to a part of the vehicle running gear rather than to the vehicle wheel axle itself. The left-hand end of this shaft 12 is suitably secured to a cylindrical brake drum 14. Secured to the open side of housing 10 opposite the open end of drum 14 is a mounting plate 16 which serves the dual purpose of completing an enclosure for the drum 14 and its associated brake assembly, and of supporting the brake assembly. This enclosure for the brake assembly obviously prevents dirt and similar undesirable matter from getting into the assembly and causing damage thereto.

A brake support plate 18 having an opening 20 is suitably secured to the central portion of mounting plate 16 by means of a plurality of bolts 22, this plate 18 being fabricated by conventional stamping methods from sheet metal. A plurality of radially outwardly projecting shoe-guiding fingers 24 are formed on support plate 18, and are axially offset with respect to each other just enough to engage the opposite sides of corresponding webs 26 of the two T-section shoes 28. Support plate 18 also has a radially outwardly extending anchor projection 30 which is axially offset to be spaced from the mounting plate 16. This projection 30 is provided with an opening 32, while mounting plate 16 is formed with a larger companion opening 34 having an axis collinear with that of opening 32. The plates 16 and 18 taken together as a unit may be considered as a brake torque-taking member having radially outwardly disposed, spaced sides which contain the openings 32 and 34.

Figure 2:
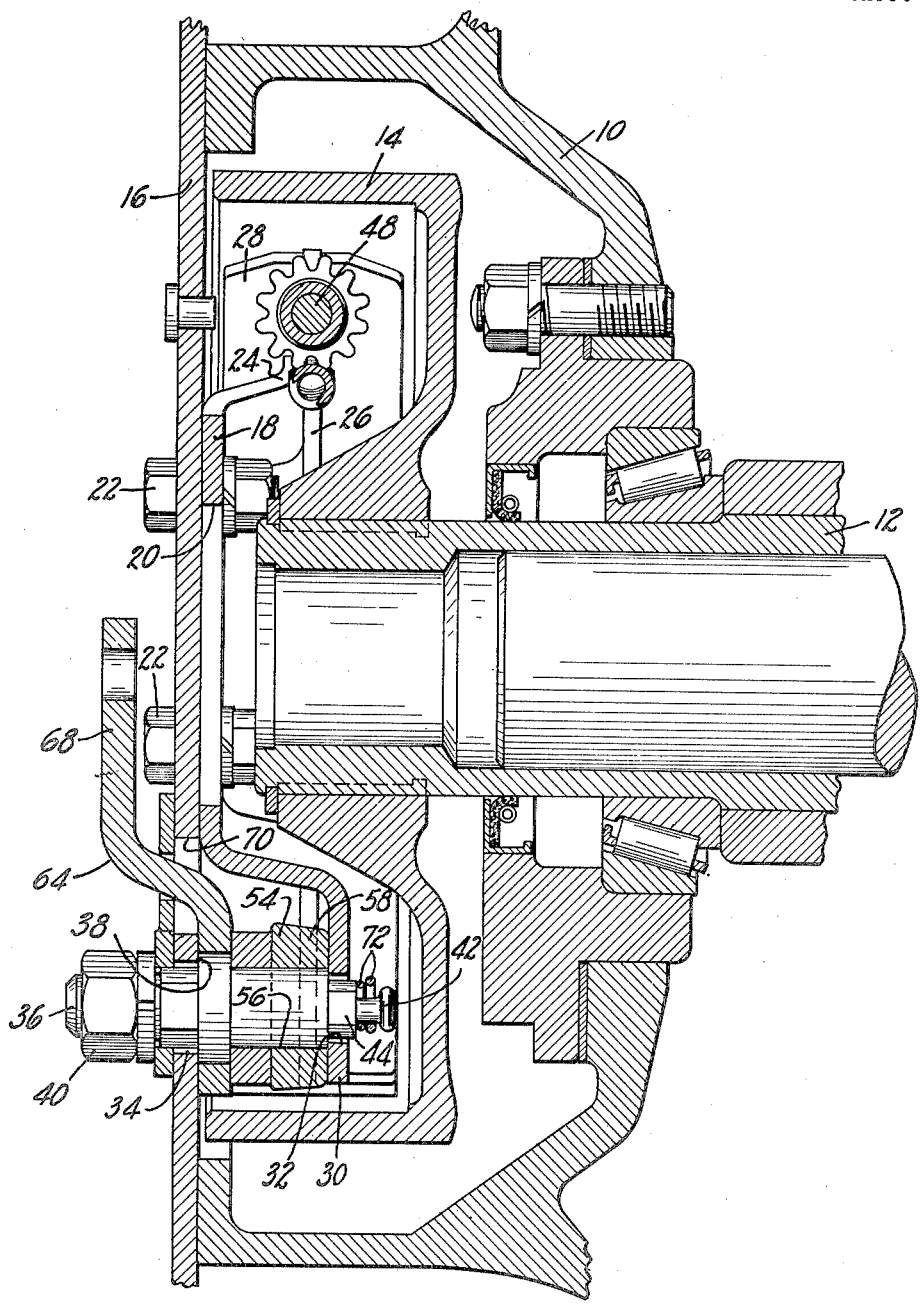
Figure 2 is an axial section taken substantially on section line 2—2 of Figure 1.
Figure 3:
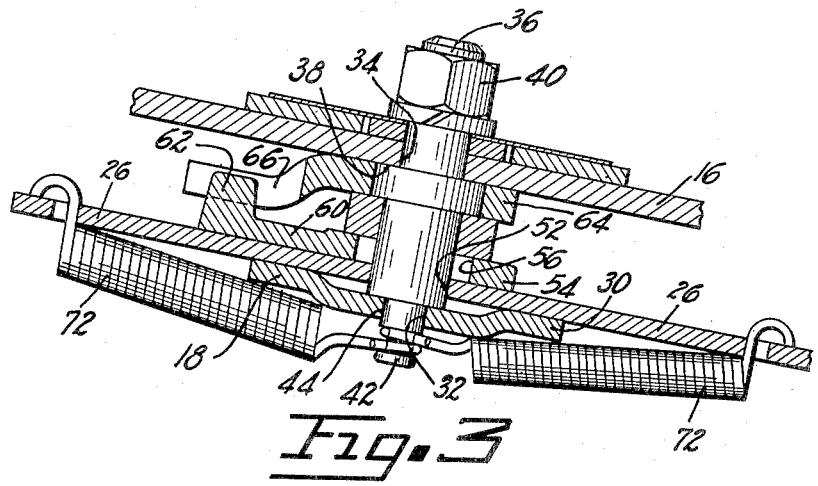
Figure 3 is a fragmental section taken substantially on section line 3—3 of Figure 1.
Figure 4:
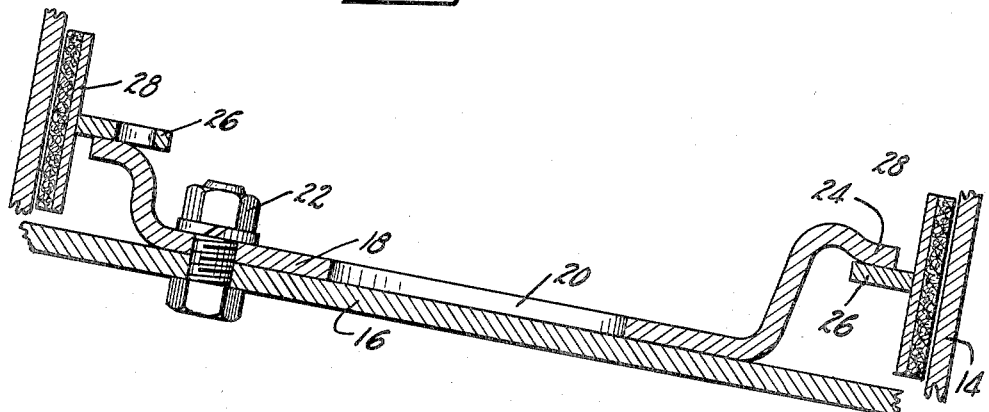
Figure 4 is a fragmental section taken substantially on section line 4—4 of Figure 1.

Received in these openings 32 and 34 is an anchor member or pin 36 having a shoulder portion 38 adapted to engage the inner side of mounting plate 16. A nut 40 is threadedly received on the end of anchor pin 36 projecting beyond the outer side of mounting plate 16 for securing said pin 36 in position. The other end 42 of pin 36 is provided with a pair of parallel, radially extending flat sides 44 which are snugly received in complementary opening 32 to thereby prevent circumferential movement of anchor pin 36 with respect to support plate 18. As is evident in Figure 2, the opening 32 is slightly longer in radial dimension than the diameter of end 42 whereby the anchor pin 36 may be shifted slightly toward or away from the center of the brake assembly. The opening 34 in mounting plate 16 and the corresponding end of anchor pin 36 are similarly formed for the same purposes. With this arrangement of mounting the anchor pin 36, adjustment of the brake is facilitated as will hereafter become apparent, and also anchor pin 36 is securely held at its ends during brake actuation.

As viewed in Figure 1, the shoes 28 are operatively connected at one set of their adjacent ends 46 by an adjustable link device 48 which is capable of transmitting the wrapping action, during brake application, of one shoe to the other. The opposite ends 50, of shoes 28, are separable and are formed with facing notches 52 which are shaped to complement and engage the adjacent sides of anchor pin 36. These points of engagement of shoe ends 50 with anchor pin 36 are between anchor projection 30 and mounting plate 16, whereby the load imposed on pin 36 is taken by the ends thereof and delivered into the mounting plate 16 and the anchor projection 30. In conventional type brakes, the anchor corresponding to anchor post 36 is usually secured only at one end whereby the anchor load imposed thereon will tend to bend it over and render the brake inoperative.

Figure 5:
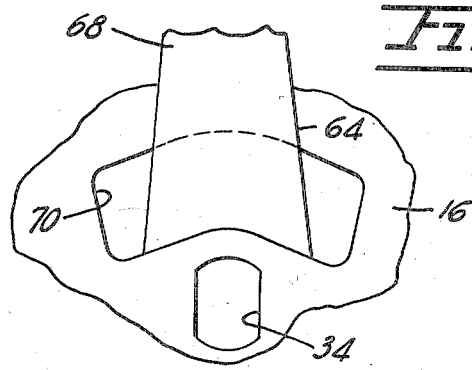
Figure 5 is a fragmental side elevation of the brake mounting plate showing the openings therethrough which accommodate the actuating lever and anchor.

The shoe ends 50 are separated for actuating the brake, by means of a shoe-spreading element or equalizing cam 54 provided with an elongated opening 56 which fits over pin 36. This elongated opening 56 permits cam 54 to shift tangentially of the brake assembly one way or the other during braking depending upon the direction of drum rotation and the consequent movement of the shoe ends 50. A pair of radially disposed shoe-end-engaging lugs 58 are provided on cam 54 to extend between the shoe ends 50, said lugs being positioned on diametrically opposite sides of anchor post 36. Cam 54 also carries a radially outwardly extending arm 60 which has formed on the outer end thereof a laterally projecting abutment 62. A bell crank type actuating lever 64 is pivotally received on anchor pin 36 between the mounting plate 16 and anchor projection 30, and has an arm 66 which extends into operative engagement with lug 62. The other arm 68 of lever 64 is bent in such a manner as to project through an arcuate opening 70 in mounting plate 16 (see Figures 2 and 5) to be positioned on the outer side of plate 16.

A pair of oppositely extending return springs 72 are connected between the end 42 of anchor pin 36 and respective shoes 28, these springs 72 forcibly drawing the shoes 28 against the anchor pin 36.

While the operation of the above described brake assembly is believed to be clear from the description, a brief explanation of the operation will now be given. Referring to Figure 1, by rotating the arm 68 of lever 64 in a clockwise direction, the arm 66 will engage abutment 62 causing cam 54 to rotate in the same direction. The lugs 58 of cam 54 thereby act on the shoe ends 50 to spread them apart thereby forcing the shoes 28 into frictional engagement with the drum 14. Assuming that drum rotation is in the direction of arrow F, the shoe end 50 on the right side of anchor pin 36 will separate therefrom and the cam 54 will correspondingly shift because of the elongation of opening 56. The shoe end 50 on the left side of pin 36 will solidly anchor, its load being transmitted through pin 36 to the anchor projection 30 and mounting plate 16. For the opposite direction of drum rotation, that is opposite to the direction of arrow F, the left-hand shoe end 50 will leave its anchor while the right-hand shoe end 50 will anchor.

The initial adjustment of the brake, after manufacturing processes have been completed, is facilitated by the available slight radial movement of the pin 36. By loosening the nut 40, the pin 36 may be shifted either radially inwardly or outwardly, as the conditions may require, until the shoes 28 are properly centralized in drum 14. Thus it is seen that a simple expedient has been provided for compensating for manufacturing tolerances to properly center the shoes within the drum.

With the design of this invention, the pin 36 serves the dual function of taking the anchor load and of supporting the brake actuating leverage mechanism. The parts of this brake assembly are for the most part fabricated by means of stamping which is relatively economical as contrasted with a forging or similar operation.

Although only one embodiment of the invention has been illustrated and described, various changes in the form and relative arrangements of the parts may be made to suit requirements.

I claim:

1. For use on a vehicle having a rotatable brake drum and a nonrotatable frame portion partially surrounding said drum, brake mechanism comprising a mounting plate adapted to be secured to said frame portion in such a manner as to completely enclose said brake drum, a supporting plate secured at its center portion to said mounting plate and having a plurality of radially outwardly projecting shoe-guiding fingers and a radially outwardly extending anchor projection spaced from said mounting plate, said anchor projection and said mounting member each having an opening, said openings being in axial alignment, an anchor pin projecting through said openings, said pin having a shoulder engaging the inner side of said mounting plate, a nut received by said pin on the other side of said mounting plate for securing said pin in place, the opening in said anchor projection being elongated to hold the corresponding end of said pin against circumferential movement but to permit slight radial movement with respect to said supporting plate, two T-section brake shoes mounted on said supporting plate and having adjacent separate end portions provided with facing notches which engage respective portions of said anchor pin, the other ends of said shoes being operatively connected, an equalizing cam loosely journalled on said pin and having spaced lugs which straddle said pin to fit between said separable shoe ends, said cam having a radially outwardly disposed abutment, an actuating lever journalled on said pin between said mounting plate and said anchor projection having one arm in operative engagement with said abutment and the other arm axially offset with respect to the brake assembly to project through a companion opening in said mounting plate whereby said last mentioned arm may be rotated to operate said cam to separate said separable shoe ends to force said shoes into said drum, and return springs connected to said shoes urging them to released position.

2. For use on a vehicle having a rotatable brake drum and a nonrotatable frame portion partially surrounding said drum, brake mechanism comprising a mounting plate adapted to be secured to said frame portion in such a manner as to completely enclose said brake drum, a supporting plate secured at its center portion to said mounting plate and having a radially outwardly extending anchor projection spaced from said mounting plate, said anchor projection and said mounting member each having an oblong opening, said openings being in axial alignment, a radially movable anchor pin projecting through said openings and being secured to said mounting plate and said anchor projection, two T-section brake shoes mounted on said supporting plate and having adjacent separable end portions provided with facing notches which engage respective portions of said anchor pin, the other ends of said shoes being operatively connected, an equalizing cam loosely journalled on said pin and having spaced lugs which straddle said pin to fit between said separable shoe ends, said cam having a radially outwardly disposed abutment, an actuating lever journalled on said pin between said mounting plate and said anchor projection having one arm in operative engagement with said abutment and the other arm axially offset with respect to the brake assembly to project through a companion opening in said mounting plate whereby said last mentioned arm may be rotated to operate said cam to separate said separable shoe ends to force said shoes into said drum, and return springs connected to said shoes urging them to released position.

3. For use on a vehicle having a rotatable brake drum and a nonrotatable frame portion partially surrounding said drum, brake mechanism comprising a mounting plate adapted to be secured to said frame portion in such a manner as to be positioned adjacent but spaced from the open side of said drum, a supporting plate secured at its center portion to said mounting plate and having a radially outwardly extending anchor projection spaced from said mounting plate, an axially extending radially movable anchor pin secured between said anchor projection and said mounting plate, two T-section brake shoes mounted on said supporting plate and having adjacent separable end portions provided with facing notches which engage respective portions of said anchor pin, the other ends of said shoes being operatively connected, an equalizing cam loosely journalled on said pin and having spaced lugs which straddle said pin to fit between said separable shoe ends, said cam having an abutment, an actuating lever journalled on said pin between said mounting plate and said anchor projection having one arm in operative engagement with said abutment and the other arm axially offset with respect to the brake assembly to project through a companion opening in said mounting plate whereby said last mentioned arm may be rotated to operate said cam to separate said separable shoe ends to force said shoes into said drum, and return springs connected to said shoes urging them to released position.

4. For use on a vehicle having a rotatable drum and a non-rotatable housing therefor, brake mechanism comprising a mounting plate adapted to be secured to said housing adjacent the open end of said drum, a supporting plate secured to said mounting plate and having a radially outwardly projecting portion laterally offset from said mounting plate, an anchor member secured between said offset portion and said mounting plate, two brake shoes carried by said supporting plate and having adjacent separable end portions which anchor on corresponding side portions of said anchor member, the other ends of said shoes being operatively connected, a shoe-spreading element loosely surrounding said anchor member and operable to spread said separable shoe ends apart to force said shoes into frictional engagement with the drum, a radially offset abutment formed on said shoe-spreading element, and an actuating lever pivoted on said anchor member between said mounting plate and said offset portion of said supporting plate, one arm of said lever operatively engaging said abutment and the other arm of said lever being bent to project through an opening in said mounting plate whereby said last mentioned arm may be rotated about said anchor member to cause said shoe spreading element to force said shoes into the drum.

5. For use on a vehicle having a rotatable drum and a non-rotatable housing therefor, brake mechanism comprising a torque-taking member adapted to be secured to said housing and being provided with a radially outwardly disposed portion having axially spaced sides, an axially extending anchor member secured between said sides, two brake shoes carried by said torque-taking member and having adjacent separable end portions which anchor on corresponding side portions of said anchor member, the other ends of said shoes being operatively connected, a shoe-spreading element loosely surrounding said anchor member and operable to spread said separable shoe ends apart to force said shoes into frictional engagement with the drum, a radially offset abutment formed on said shoe-spreading element, and an actuating lever pivoted on said anchor member between said sides, one arm of said lever operatively engaging said abutment and the other arm of said lever being bent to project through an opening in said torque-taking member whereby said last mentioned arm may be rotated about said anchor member to cause said shoe-spreading element to force said shoes against the drum.

6. For use on a vehicle having a rotatable drum and a non-rotatable housing therefor, brake mechanism comprising a torque-taking member adapted to be secured to said housing and being provided with a radially outwardly disposed portion having axially spaced sides, an axially extending anchor member secured between said sides, two brakes shoes carried by said torque-taking member and having adjacent separable end portions which anchor on corresponding side portions of said anchor member, and an actuating lever pivotally carried by said anchor member and having one arm operative to effect spreading of said separable end portions and having the other arm bent to project through an opening in said torque-taking member whereby this last mentioned arm may be rotated about such anchor member to cause said shoes to be forced into frictional engagement with the drum.

References Cited in the file of this patent

UNITED STATES PATENTS

| | | |
|---|---|---|
| 1,651,608 | La Brie | Dec. 6, 1927 |
| 1,911,439 | Delahaye | May 30, 1933 |
| 1,913,166 | Lindblom | June 6, 1933 |
| 2,074,725 | Goepfrich | Mar. 23, 1937 |
| 2,098,657 | Goepfrich | Nov. 9, 1937 |
| 2,141,127 | Eksergian | Dec. 20, 1938 |
| 2,185,434 | Goepfrich | Jan. 2, 1940 |
| 2,412,335 | House | Dec. 10, 1946 |

FOREIGN PATENTS

| | | |
|---|---|---|
| 346,073 | Great Britain | Apr. 9, 1931 |
| 397,045 | Great Britain | Aug. 17, 1933 |